United States Patent [19]

Jaskolski

[11] Patent Number: 4,650,379

[45] Date of Patent: Mar. 17, 1987

[54] PIN MACHINING FIXTURE

[76] Inventor: Henry M. Jaskolski, 255 Fielding Rd., Rochester, N.Y. 14626

[21] Appl. No.: 743,676

[22] Filed: Jun. 11, 1985

[51] Int. Cl.4 .......................... B23Q 3/06; B23Q 3/154

[52] U.S. Cl. ...................................... 409/220; 269/43; 269/902; 408/76; 408/103; 408/108; 409/903

[58] Field of Search ........................ 408/76, 87, 95, 97, 408/98, 103, 108, 115 R, 115 B; 269/43, 44, 156, 902; 409/219, 220, 225, 226, 903

[56] References Cited

U.S. PATENT DOCUMENTS

| | | | |
|---|---|---|---|
| 542,372 | 7/1895 | Oefinger . | |
| 1,093,029 | 4/1914 | Bowen | 408/95 X |
| 1,353,294 | 9/1920 | Vidaver . | |
| 1,476,611 | 12/1923 | Hines | 408/97 X |
| 1,637,030 | 7/1927 | Thyssen . | |
| 2,343,088 | 2/1944 | Sherman | 408/97 |
| 2,753,740 | 7/1956 | Marx | 408/87 |
| 4,005,945 | 2/1977 | Gutman . | |
| 4,408,753 | 10/1983 | Chapman et al. . | |

FOREIGN PATENT DOCUMENTS

| | | | |
|---|---|---|---|
| 154281 | 3/1982 | German Democratic Rep. | 269/44 |
| 3221 | of 1910 | United Kingdom | 408/115 R |

*Primary Examiner*—Gil Weidenfeld
*Assistant Examiner*—Steven C. Bishop
*Attorney, Agent, or Firm*—Stonebraker, Shepard & Stephens

[57] ABSTRACT

A pin machining fixture 10 has a plurality of openings 25 extending through a body having exterior surfaces 11-16 that lie accurately in three pairs of parallel planes that intersect perpendicularly. Each of the through openings 25 has a location notch 26, and the apexes of location notches 26 are equally spaced apart and arranged in a plane parallel with a pair of exterior surfaces. Set screws 30 threaded into the body clamp a pin or work piece 20 in each of location notches 26 so that a portion of each pin 20 extends beyond one exterior surface for machining. An abutment key 40 is preferably adjustable within the exterior surfaces of fixture 10 for locating ends of a plurality of pins 20 to be clamped and machined.

25 Claims, 6 Drawing Figures

PIN MACHINING FIXTURE

BACKGROUND

Mold pins are used in large numbers in a wide variety of sizes and shapes that have to be accurately machined. Multiple copies of the same mold pin configuration are also often required so that the same machining steps must be repeated for several identical pins.

To save on laborious and repetitious machining of mold pins, I have devised a fixturing system that allows several work piece pins to be clamped in positions that are accurately spaced apart and parallel so that the same machining operation can be done rapidly and successively on each fixtured pin. My fixturing system accommodates a large variety of sizes and shapes of pins and offers versatility, convenience, and accuracy in positioning pins in different ways for different machining operations. Although the repetitious machining of mold pins motivated my invention, my fixturing system is not limited to mold pins and can be applied to similar work pieces requiring machining of identical shapes.

SUMMARY OF THE INVENTION

My system uses a fixture with a body having exterior surfaces that lie in three pairs of parallel planes that intersect perpendicularly. The body has a plurality of through openings extending between a side pair of the parallel surfaces, and each of the openings has a location notch to receive a pin or work piece. The location notches are equally spaced apart and arranged in a plane parallel with and between a spanning pair of the parallel exterior surfaces. Set screws threaded into the body clamp a pin in each of the location notches so that a portion of each pin extends beyond one of the side pair of parallel exterior surfaces for machining. My system also preferably includes an abutment key adjustably mounted on the fixture for engaging and locating end regions of a plurality of pins or work pieces disposed in the location notches. The abutment key can have small magnets positioned to hold pins in abutment with the key while the pins are clamped in location notches.

DRAWINGS

DETAILED DESCRIPTION

Figure 1:
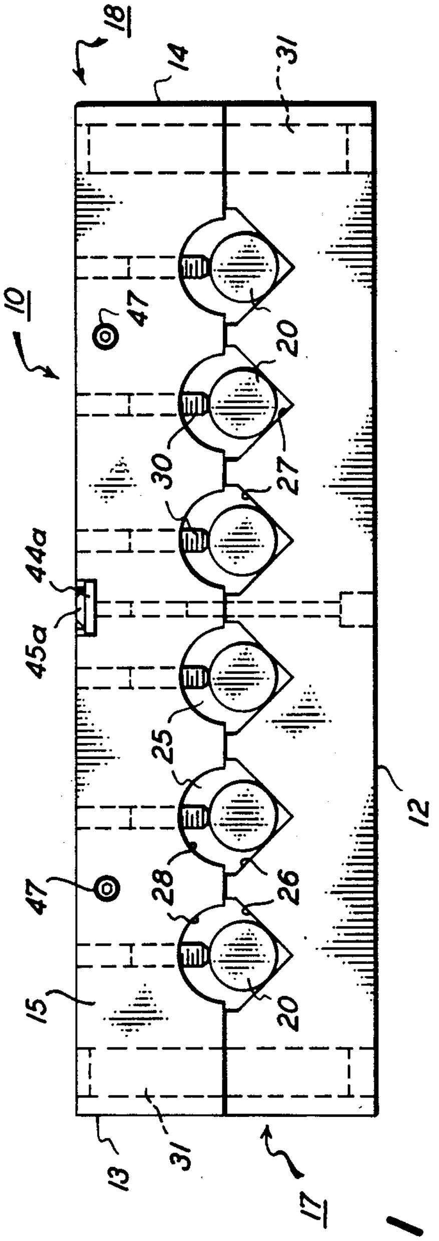
FIG. 1 is a front side elevational view of a preferred embodiment of a fixture according to my invention.

My fixture 10 is formed as an accurate block having a base or bottom 17 and a top 18 with exterior surfaces machined to form three pairs of accurately parallel planes intersecting perpendicularly. For example, top surface 11 and bottom surface 12 are both accurately parallel and perpendicular to end surfaces 13 and 14 that are also parallel with each other. All of these surfaces 11–14 are accurately perpendicular with parallel front side surface 15 and back side surface 16. Surfaces 11–16 allow fixture 10 to stand square and true relative to various machine tools.

Dividing fixture 10 into bottom 17 and top 18 facilitates machining of a plurality of through openings 25 extending between front side 15 and back side 16. Each through opening 25 has a location notch 26, preferably formed in bottom 17. The sides of each location notch 26 are preferably perpendicular to each other as shown, and small recesses 27 are preferably ground at the apex of each notch 26.

The apex intersections of the perpendicular surfaces of each location notch 26 are all accurately spaced in a plane that is accurately parallel with and in between top surface 11 and bottom surface 12. This ensures that the axes of equal sized pins or work pieces 20 positioned in location notches 26 also lie accurately in a plane parallel with and in between top surface 11 and bottom surface 12.

Apexes of location notches 26 are also accurately parallel with each other and accurately spaced apart to establish a predetermined distance between the parallel axes of pins 20. I also prefer predetermined and equal distances between end surfaces 13 and 14 and the respectively nearest apex of a location notch 26.

I prefer semi-cylindrical bores 28 formed in top 18 to register with location notches 26. These can be made simply by boring a plurality of holes in a work piece that is then divided to form a pair of tops 18.

Set screws 30 are threaded through top 18 on paths that intersect the apexes of location notches 26 so that set screws 30 can clamp pins 20 securely in place. I prefer a pair of set screws 30 for each location notch 26, although other clamping and set screw arrangements are possible.

Figure 2:
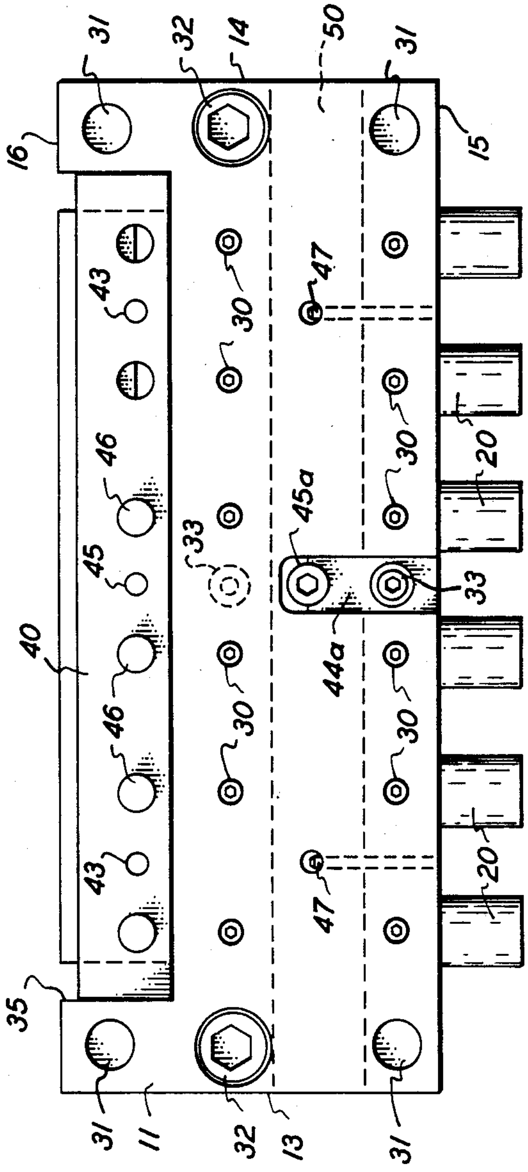
FIG. 2 is a top view of the fixture of FIG. 1.

Top 18 and bottom 17 are securely and accurately fastened together during use. Again, many possibilities are available, and I prefer alignment dowels 31 and screws 32 as shown in FIG. 2. Since set screws 30 turned against work pieces 20 tend to bow apart the centers of bottom 17 and top 18, I prefer additional fastening screws 33 screwed into top 18 from a central region of bottom 17. One of these screws 33 is shown in phantom in FIG. 2.

Work pieces or pins 20 are located in notches 26 to extend beyond front surface 15 by equal amounts so that their extended regions can be machined. For setting corresponding axial positions for pins 20, I prefer an abutment key 40 that can be adjustably positioned for locating the unextended ends of pins 20. One place I dispose abutment key 40 is in a recess 35 machined into back side surface 16. There, key 40 extends transversely of location notches 26, is adjustable to various positions between top surface 11 and bottom surface 12, and is recessed relative to back side surface 16.

Abutment key 40 is generally L-shaped in cross section so as to dispose a horizontal surface 41 over the upper surfaces of pins 20 and a vertical surface 42 against the positioned ends of pins 20. These can include a pin head 21 having a flat 22 as illustrated. An infinite variety of pin or work piece shapes are possible, and heads 21 with flats 22 merely provide an example for illustration purposes.

Abutment key 40 vertically guides on a pair of dowel pins 43 mounted in base 17. A screw 45 that is freely rotatable in plate 44 recessed into bottom surface 12 of base 17 is threaded through abutment key 40 so that turning screw 45 raises and lowers abutment key 40.

I also prefer that abutment key 40 be made of non-magnetic stainless steel and hold a magnet 46 registered with the abutment region for each work piece. Since work pieces or pins 20 are often magnetic, magnets 46 can hold a plurality of work pieces 20 against abutment key 40 while set screws 30 are tightened to clamp each pin 20 in place. Magnets 46 can be removable from key 40 if desired or can be formed as electro-magnets that can be turned on and off.

Fixture 10 is made even more versatile by providing a through channel 50 extending between ends 13 and 14 and intersecting all the location notches 26 to provide an alternative position for abutment key 40. Channel 50 is preferably machined to extend closer to bottom surface 12 than the apexes of location notches 26. This divides location notches 26 into two parts, each of which is preferably confronted by a set screw 30.

Figure 6:
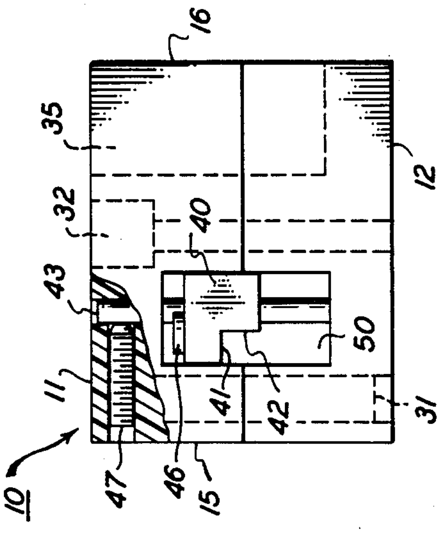
FIG. 6 is a partially cut-away end view similar to the view of FIG. 3, but showing the abutment key in an alternative position.
Figure 4:
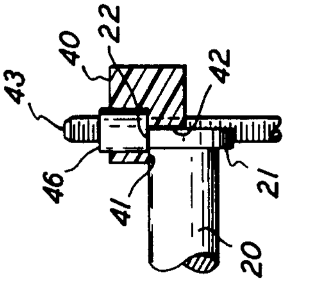
FIG. 4 is a fragmentary, partially cross-sectioned view of the abutment key of the fixture of FIG. 3.
Figure 3:
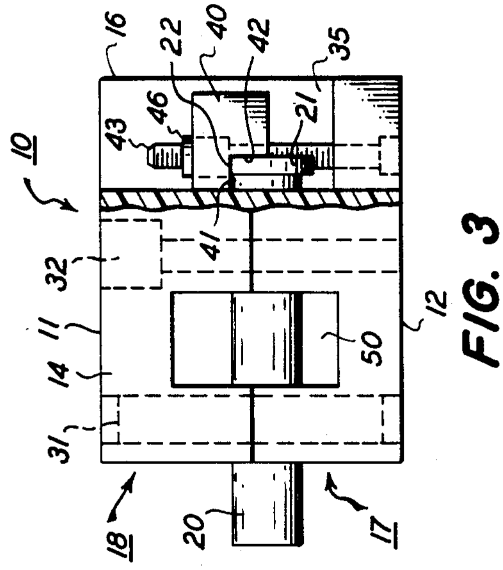
FIG. 3 is a partially cut-away end view of the fixture of FIGS. 1 and 2.
Figure 5:
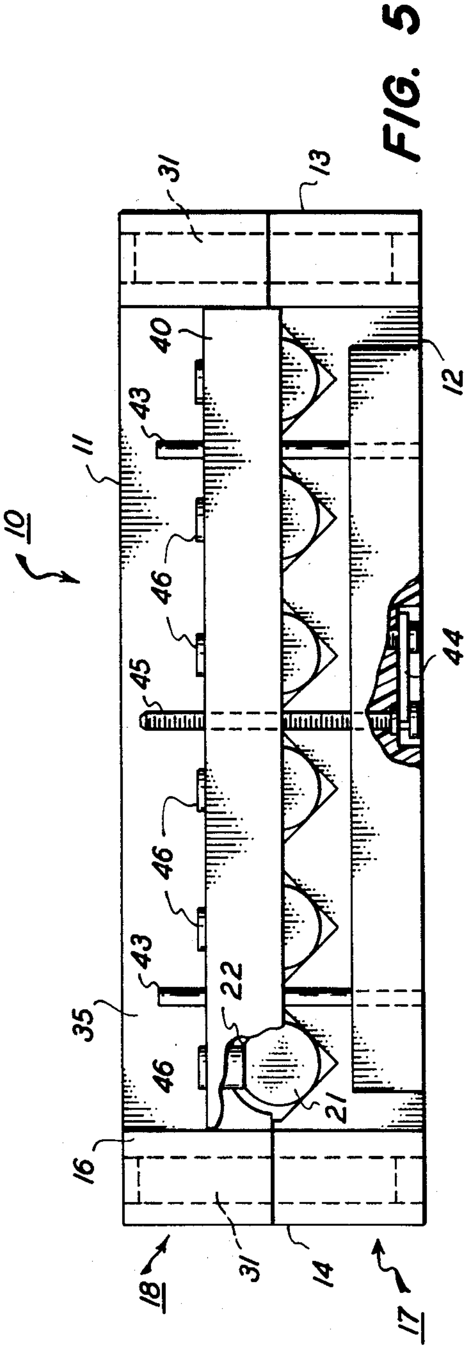
FIG. 5 is a partially cut-away back side view of the fixture of FIGS. 1–4.

As shown in FIG. 6, abutment key 40 can be arranged in through channel 50 where it guides vertically on dowel pins 43 that can be held in place by set screws 47. Another adjustment screw **45*a* rotatably mounted on plate 44*a* recessed into top surface 11 of top 18 can be threaded through abutment key 40 to adjust key 40 vertically in the same way as screw 45 in recess 35**.

Abutment key 40 arranged in through channel 50 as shown in FIG. 6 can serve as an end abutment for pins or work pieces that are too short to extend from beyond front surface 15 to recess 35. Such pins can be clamped into forward portions of location notches 26 by the set screws 30 that are nearest to front surface 15.

Fixture 10 can be formed with different numbers of location notches 26 and can be formed in different sizes to accommodate smaller and larger pins or work pieces 20. The desired number of these are placed in respective notches 26, preferably with the aid of abutment key 40 positioning the located end of each pin relative to fixture 10. Preferably with the aid of magnets 46, pins 20 are held against abutment key 40 while set screws 30 are tightened to clamp each pin 20 in its respective location notch 26. These steps proceed quickly once abutment key 40 is properly positioned for locating ends of the pins to be machined. Then all pins 20 extend by an equal amount from front face 15 where they can all be machined with identical surfaces or bores. Pins 20 can also have identical angular orientations relative to flats or notches that can be positioned against abutment key 40. The same machining operation can then be repeated quickly on each pin 20 by resting fixture 10 on one of its accurate external surfaces 11–16.

I claim:

1. A pin machining fixture comprising:
- a. a body having exterior surfaces that lie in three pairs of parallel planes that intersect perpendicularly so that a plane surface can engage any of said exterior surfaces for accurately positioning said body relative to a machining tool;
- b. a plurality of openings extending through said body between a side pair of said parallel exterior surfaces;
- c. each of said openings having a location notch;
- d. apexes of said location notches being equally spaced apart, parallel with each other, and all arranged in a plane parallel with and in between a spanning pair of said parallel exterior surfaces; and
- e. set screws threaded into said body for clamping a pin in each of said location notches so that a portion of each pin extends an equal distance beyond one of said side pair of said parallel exterior surfaces so said extending portions of said pins can be uniformly machined.

2. The fixture of claim 1 wherein said body is formed of a base and cover firmly secured together, said locating notches are formed in said base, a portion of each of said openings is formed in said cover, and said set screws are threaded into said cover.

3. The fixture of claim 1 wherein distances between an end pair of said parallel exterior surfaces and the respectively nearest one of said apexes are equal.

4. The fixture of claim 1 including a through channel extending through said body between an end pair of said parallel exterior surfaces to intersect each of said location notches, and wherein said set screws for each of said location notches are arranged on opposite sides of said through channel.

5. The fixture of claim 1 including a pin abutment key adjustably mounted on said fixture for engaging and locating end regions of a plurality of pins disposed in said location notches.

6. The fixture of claim 5 including guide pins and a screw adjuster for moving said pin abutment key radially of said plurality of pins in a plane perpendicular to said plane of said apexes.

7. The fixture of claim 5 including two mounting positions for said pin abutment key, one of said mounting positions being in a recess formed in one of said side pair of parallel exterior surfaces, and another of said mounting positions being in a through channel intersecting said location notches and extending between an end pair of said parallel exterior surfaces.

8. The fixture of claim 7 including guide pins and a screw adjuster arrangeable at each of said mounting positions for adjusting the radial spacing of said pin abutment key from said plurality of pins.

9. The fixture of claim 5 wherein said pin abutment key is L-shaped in cross section to engage end regions and end side regions of said plurality of pins.

10. The fixture of claim 5 wherein said pin abutment key has a plurality of apertures registered with said location notches for receiving magnets to hold said plurality of pins in abutment with said key while said pins are clamped in said location notches.

11. A method of fixturing a plurality of pins for machining, said method comprising:
- a. locating said pins in notches formed in openings through a fixture so that said notches are equally spaced apart, parallel with each other, and equally spaced from a plane exterior surface of said fixture;
- b. using set screws threaded into said fixture to clamp one of said pins in each of said location notches so that each of said pins extends an equal distance beyond an exterior surface of said fixture transverse to said notches; and
- c. using exterior surfaces of said fixture lying in three pairs of parallel planes intersecting perpendicularly for locating said equally spaced, outward extending portions of said clamped pins relative to a machining tool.

12. The method of claim 11 including using a pin abutment key adjustably mounted on said fixture for engaging and locating end regions of said plurality of pins.

13. The method of claim 12 including making said pin abutment key L-shaped in cross section to engage end regions and end side regions of said plurality of pins.

14. The method of claim 12 including using magnets arranged in said pin abutment key to hold said pins in engagement with said key while said pins are clamped in said location notches.

15. The method of claim 12 including arranging two mounting positions axially spaced relative to said location notches for mounting said adjustable pin abutment key.

16. A method of accurately locating and orienting a plurality of pins for machining a predetermined shape on each of said pins, said method comprising:

a. using a fixture having a body with exterior surfaces lying in three pairs of parallel planes that intersect perpendicularly, said body having a plurality of through openings extending between a side pair of said parallel exterior surfaces;

b. forming location notches in said through openings so that apexes of said location notches are spaced equally from each other and parallel with each other and lie in a plane that is parallel with and in between a spanning pair of said parallel exterior surfaces;

c. clamping a pin in each of said location notches so that each pin extends a predetermined distance beyond one of said side pairs of parallel exterior surfaces; and d. using equal spacing of said pins clamped in said notches and said parallel and perpendicular exterior surfaces for uniformly positioning said extending portions of said pins relative to a tool for machining said predetermined shape.

17. The method of claim 16 including forming said fixture of a base and a cover firmly secured together, forming said location notches in said base, forming a portion of said through openings in said cover, and using set screws threaded into said cover for clamping said pins in said location notches.

18. The method of claim 16 including forming a through channel extending between an end pair of said parallel exterior surfaces to intersect said location notches, and threading said set screws into said cover on opposite sides of said through channel for each of said location notches.

19. The method of claim 16 including making distances between an end pair of said parallel exterior surfaces and the respectively nearest one of said apexes equal.

20. The method of claim 16 including using a pin abutment key adjustably mounted on said fixture for engaging and locating end regions of said pins.

21. The method of claim 20 including using guide pins and a screw adjuster for moving said pin abutment key radially of said plurality of pins.

22. The method of claim 20 including mounting said pin abutment key in either of two adjustable mounting positions on said fixture, one of said mounting positions being in a recess formed on one of said side pair of parallel exterior surfaces, and another of said mounting positions being in a through channel intersecting said location notches and extending between an end pair of said parallel exterior surfaces.

23. The method of claim 22 including using guide pins and a screw adjuster arrangeable at each of said mounting positions for adjusting the radial spacing of said pin abutment key from said plurality of pins.

24. The method of claim 20 including making said pin abutment key L-shaped in cross section to engage end regions and end side regions of said plurality of pins.

25. The method of claim 20 including using a plurality of apertures formed in said pin abutment key to register with said location notches for receiving magnets to hold said plurality of pins in abutment with said key while said pins are clamped in said location notches.

* * * * *